United States Patent [19]

Arnold

[11] 4,332,391
[45] * Jun. 1, 1982

[54] UNIVERSAL MECHANICAL SEAL GLAND

[76] Inventor: William A. Arnold, 15 Long Boat Pl., Savannah, Ga. 31410

[*] Notice: The portion of the term of this patent subsequent to Mar. 17, 1998, has been disclaimed.

[21] Appl. No.: 208,061

[22] Filed: Nov. 17, 1980

Related U.S. Application Data

[62] Division of Ser. No. 142,139, Apr. 16, 1980, Pat. No. 4,256,313.

[51] Int. Cl.³ ............................................. F16J 15/34
[52] U.S. Cl. .................................................... 277/11
[58] Field of Search ...................... 277/9, 11, 32, 81 R

[56] References Cited

U.S. PATENT DOCUMENTS

| | | | |
|---|---|---|---|
| 3,388,913 | 6/1968 | Tracy | 277/32 |
| 3,441,284 | 4/1969 | Murray et al. | 277/32 |
| 3,961,799 | 6/1976 | Peet | 277/9 |
| 4,256,313 | 3/1981 | Arnold | 277/32 |

*Primary Examiner*—William Price
*Attorney, Agent, or Firm*—Nathaniel A. Humphries

[57] ABSTRACT

A universal mechanical seal gland formed of plastic has a central aperture positionable over a shaft extending from a housing for positioning a stationary seal against a rotary seal on the shaft. The central aperture is formed of a plurality of cylindrical and radial surfaces which define sealing surfaces permitting the gland to be used with a variety of differently sized and shaped seal members and housings and differently sized shafts.

7 Claims, 8 Drawing Figures

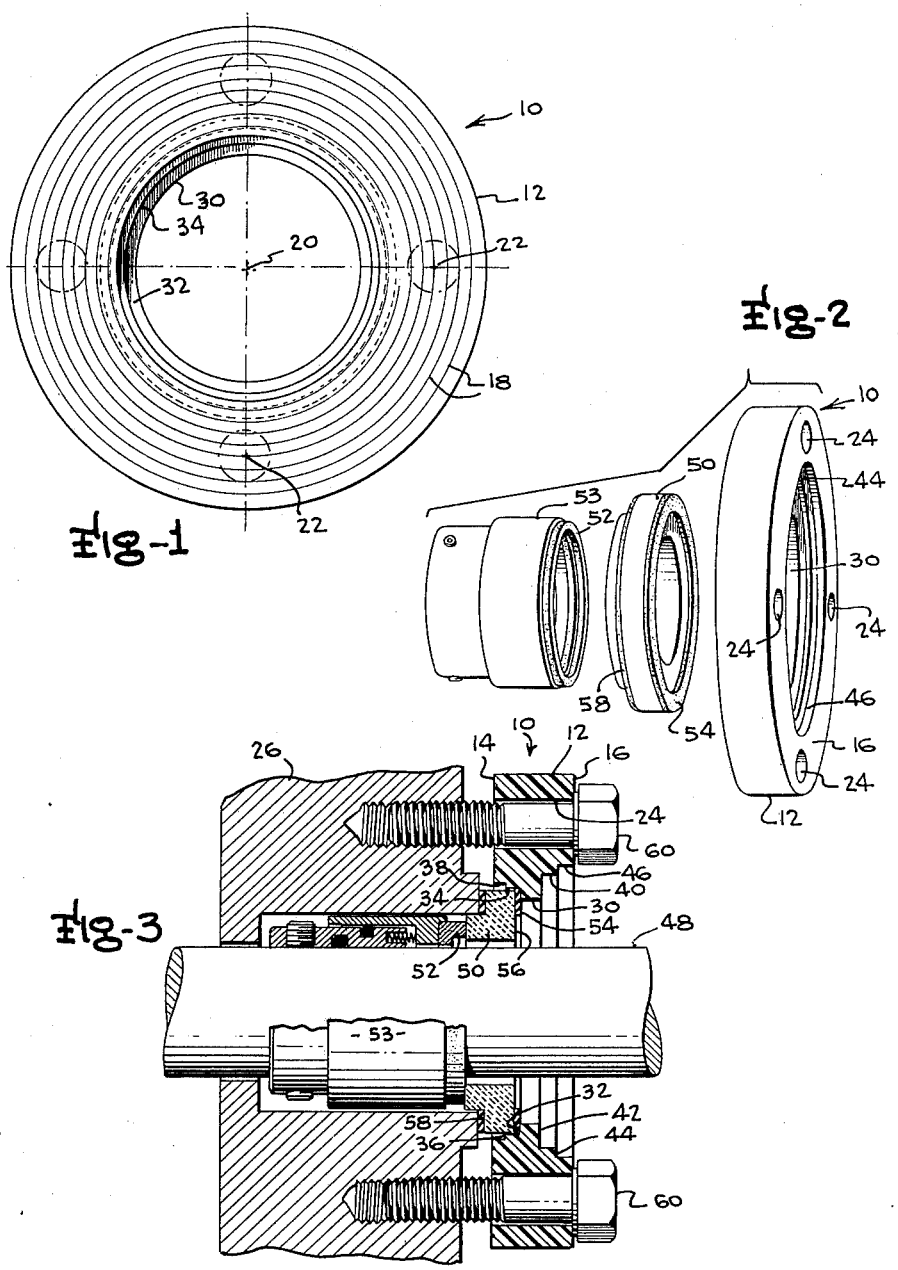

U.S. Patent Jun. 1, 1982 Sheet 2 of 2 4,332,391
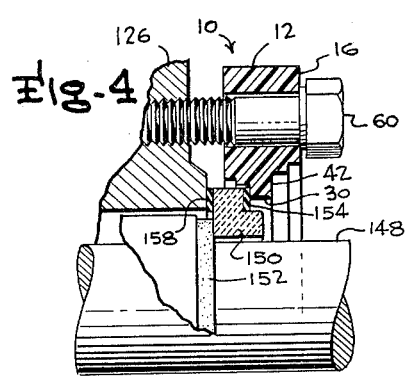
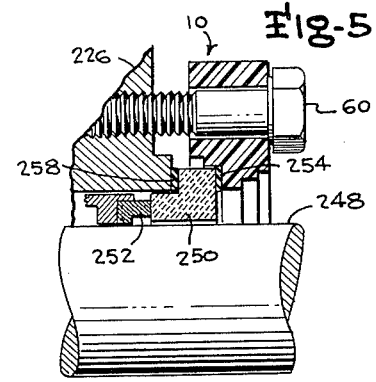
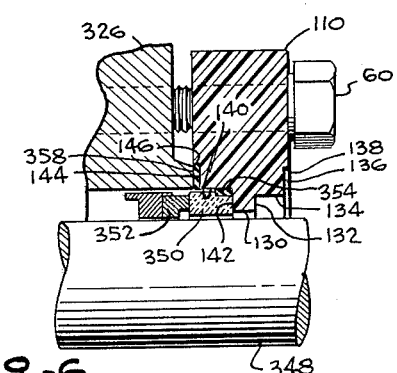
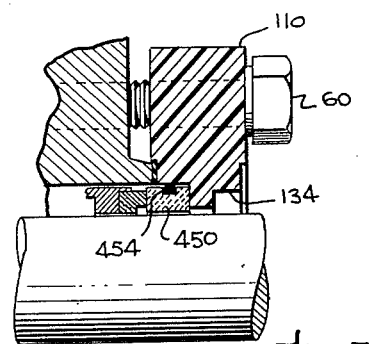
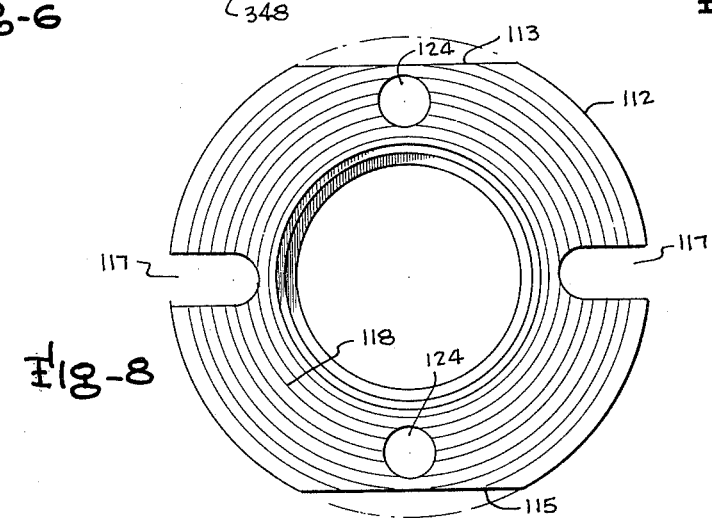

UNIVERSAL MECHANICAL SEAL GLAND

This is a division of application Ser. No. 06/142,139, filed Apr. 16, 1980, now U.S. Pat. No. 4,256,313.

BACKGROUND OF THE INVENTION

This invention is in the field of rotary shaft seals and is more particularly directed to a seal gland capable of usage with a variety of rotary mechanical shaft seals of different sizes and shapes.

A wide variety of devices such as pumps, compressors and the like employ rotary shafts supported for rotation in a housing in which pressurized liquid engages the shaft on the interior of the housing and tends to leak outwardly along the shaft to the exterior of the housing. Such leakage is obviously undesirable for a variety of reasons such as environmental contamination where the liquid is a hazardous chemical, cost of the lost liquid, cleanup costs and maintenance costs and the loss of energy resulting from such leakage. A common and well-known expedient for reducing leakage around a shaft is that of providing a stuffing box surrounding the shaft with packed stuffing material being held in contact with the shaft. Improvements over the stuffing box concept have included rotary mechanical seals which basically consist of an annular rotary seal member fixed to the shaft for rotation therewith and having a radial surface engageable with a radial surface of a fixed annular seal member held in position against the rotary seal by a gland member machined to provide the necessary geometry and spacing for effecting a satisfactory contact between the contacting radial surfaces of the rotary annular seal member and the fixed annular seal member. Such a conventional gland construction is illustrated by element 36 in FIG. 2 of the prior Peet U.S. Pat. No. 3,961,799. Additionally, the Peet patent also illustrates other differently shaped gland members $26_1$, $26_2$, and $26_3$, all of which share in common the fact that they can only be used with a rotary shaft of a given diameter and are not usable in other devices having shafts of different diameters. While the devices illustrated in the Peet patent represent an advancement over the prior art, they suffer from the disadvantage that they consume a substantial amount of space axially along the length of the shaft with which they are associated by virtue of the fact that the sealing system disclosed in the Peet patent necessarily requires an adapter ring 46 or 94 which necessarily increases the axial length of the space in which the sealing components must be located. Thus, not only is the system of the Peet patent incapable of using the same gland for different sizes of shafts, it also suffers from the disadvantage of requiring a substantial amount of axial space along the length of the shaft and is therefore unusable with apparatus in which such space is not available. Thus, an essential requirement of the Peet system is the employment of the adapter rings 46, 94 for positioning between the gland member and a specially designed universal fixed sealing member such as members 44, 44', 80 and 98 as illustrated in the Peet patent. The present universal gland member invention avoids the need for using such specially designed seal members, eliminates the need for adapter rings and also permits the usage of the universal gland member with a wide variety of mechanical seal constructions and different shaft sizes.

SUMMARY OF THE INVENTION

Therefore, it is a primary object of the present invention to provide a new and improved mechanical seal gland.

The further object of the present invention is the provision of a new and improved mechanical seal gland capable of usage with a wide variety of mechanical seal constructions, different shaft sizes and different gland bolting configurations.

Achievement of the foregoing objects is permitted by the preferred embodiment of the present invention through the provision of a mechanical seal gland comprising a polypropylene body having an axially extending aperture extending between parallel front and rear planar surfaces with the axially extending aperture being defined by a plurality of cylindrical surfaces connected by radial surfaces with the cylindrical surfaces being of different diameters. The smallest diameter cylindrical surface is centrally positioned midway between the front and rear surfaces of the polypropylene block with adjacent cylindrical surfaces respectively being provided between the smaller diameter surface and the front and rear surfaces. The cylindrical surfaces in conjunction with their adjacent radial surfaces define step annular seal engaging surfaces which engage an annular stationary seal member formed of ceramic material or the like for holding the seal member in contact with a shaft-mounted rotary seal component of a mechanical seal combination. The plurality of such annular surfaces on the gland permit its usage with a wide variety of fixed stationary seal members as occur with different sizes of shafts with the only limitation being that the diameter of the shaft must be less than the diameter of the centrally positioned smallest diameter cylindrical surface of the gland.

The gland member is provided with a plurality of concentric circles formed in its front surface for providing a guide for permitting mounting apertures to be bored at desired radial distances from the center of the gland for permitting connection of the gland to tapped openings in a particular pump or compressor housing. Additionally, the gland body can be provided with inwardly extending bolt-receiving slots which extend inwardly from the cylindrical periphery of the gland or it can be provided with pre-bored mounting bolt receiving holes if desired. Another variation of the gland resides in the provision of chordal surfaces forming a portion of the outer periphery of the gland so as to permit it to be fitted onto housings having space limitations which would not accommodate a gland having a cylindrical outer periphery of the same diameter as the diameter of the cylindrical portions of the gland.

A better understanding of the construction and usage of the preferred embodiments of the present invention will be achieved when the following detailed description is considered in conjunction with the appended drawings in which like reference numerals are used for the same parts in the different views.

BRIEF DESCRIPTION OF THE DRAWINGS

FIG. 1 is a front elevation view of the preferred embodiment;

FIG. 2 is an exploded perspective view of the preferred embodiment shown in association with a typical conventional rotary and fixed seal component of a mechanical seal;

FIG. 3 is a bisecting sectional view of a portion of a housing, shaft and mechanical seal means with which the preferred embodiment is associated;

FIG. 4 is a sectional view similar to FIG. 3 but illustrating the universal gland with a second type seal used in conjunction with a second shaft size;

FIG. 5 is a sectional view similar to FIGS. 3 and 4 but illustrating the universal gland in use with a third type seal and a third shaft size;

FIG. 6 is a sectional view similar to FIGS. 3-5, but illustrating a second embodiment of the universal gland in use with a sealing member requiring a peripheral seal connection;

FIG. 7 is a sectional view similar to FIG. 6 illustrating the second embodiment of the universal gland in use with the different type of peripheral seal; and FIG. 8 is a front elevation view of a third embodiment of universal gland.

DESCRIPTION OF THE PREFERRED EMBODIMENT

Attention is initially invited to FIGS. 1-3 of the drawings which illustrate the preferred embodiment of the universal gland, generally designated 10, which comprises a solid body formed of polypropylene having a cylindrical peripheral surface 12 and a front generally planar face surface 14 and a generally planar rear face surface 16. The generally planar front face surface 14 is provided with a plurality of inscribed concentric bolt hole circles 18 which are concentric to a main axis 20. Concentric bolt hole circles 18 permit the location of bolt hole centers 22 at desired diameters for a particular installation as is required by the housing in which mounting bolts for the gland are to be mounted. FIG. 1 merely illustrates the bolt hole openings in phantom lines; however, FIGS. 2 and 3 illustrate the condition of the gland following the boring of bolt holes 24 preparatory to installation of the gland on a particular housing 26 as shown in FIG. 3.

The universal gland 10 is provided with a central aperture extending between the front base surface 14 and rear face surface 16 which is defined by a plurality of concentric cylindrical surfaces of different diameter which are connected by radial surfaces. More specifically, a central cylindrical surface 30 is provided at a medial location midway between the front and rear face surfaces 14 and 16 and is connected by a first radial surface 32 to a second cylindrical surface 34 of greater diameter than that of surface 30. A second radial surface 36 connects the second cylindrical surface 34 to a third cylindrical surface 38 which extends to the planar front face surface 14. The third cylindrical surface 38 is of greater diameter than the diameter of the second cylindrical surface 34.

A fourth cylindrical surface 40 is connected to the central cylindrical surface 30 on an opposite side by means of a third radial surface 42 with the fourth cylindrical surface 40 being of greater diameter than the diameter of the third cylindrical surface 38. A fourth radial surface 44 connects the fourth cylindrical surface 40 to a fifth cylindrical surface 46 which is of greater diameter than that of fourth cylindrical surface 40. It will be observed that the various cylindrical surfaces cooperate with their adjacent radial surfaces to provide annular seats for annular seal members in a manner to be discussed hereinafter.

FIG. 3 illustrates the manner in which the universal gland 10 is mounted on a housing having a rotary shaft 48 on which a rotary seal 52 is mounted for rotation in engagement with a junction with a stationary seal 50 of conventional design. It is to be understood that rotary seal member 52 is connected to the shaft 48 for rotation therewith by conventional means. The stationary seal 50 and the rotary seal 52 have contacting radial sealing surfaces which operate in a well-known manner. An annular gasket 54 is provided between the first radial surface 32 of the gland 10 and a radial end surface 56 of the stationary seal member 50 with a second annular gasket 58 being compressed between the stationary seal member 50 and the side of the housing 26 as clearly shown in FIG. 3. The universal seal gland member 10 holds the seal components 50 and 52 in the illustrated position as a result of the tightening of bolt members 60 extending through apertures 24 which have previously been drilled on the proper concentric bolt hole circles 18.

FIG. 4 illustrates the manner in which the universal seal gland 10 can similarly be employed with a different housing 126 and a shaft 148 of less diameter for holding a second type stationary annular seal 150 in contact with a second rotary seal member 152. It will be observed that a first annular gasket 154 is clamped between the radial surface 32 and the end surface of the stationary seal member 150 while a second annular gasket 156 is clamped against the side of housing 156 with the seal members 150 and 152 being in sealing contact. Thus, it will be seen that the universal seal gland provides an effective mounting of the stationary seal member 150 in conjunction with the rotary seal 152, casing 126 and shaft 148.

FIG. 5 illustrates the mounting of the universal seal gland 10 in conjunction with a third housing 226 of a pump or the like having a shaft 248 of a third diameter. In the embodiment of FIG. 5, a third stationary seal member 250 is held in contact with a third rotary seal member 252 with the stationary seal member 250 engaging an outer gasket 254 which also engages the third radial surface 42 of the universal gland member 10. The opposite side of stationary seal member 250 is engaged with an inner annular gasket 258 which also engages the end of the housing 226 in an obvious manner. Thus, FIG. 5 illustrates the manner in which the universal gland seal can be mounted with a third sealing surface in conjunction with a third shaft size. The other radial surfaces can be similarly engaged with different sized stationary seal members.

FIG. 6 illustrates a second embodiment 110 of the universal seal gland in which a centrally positioned cylindrical surface 130 is provided in conjunction with a second cylindrical surface 134, a first radial surface 132, a second radial surface 136 and a third cylindrical surface 138 of reduced axial extent. Additionally, a third radial surface 142 provides a connection from the central cylindrical surface 130 to a fourth cylindrical surface 140 connected to a fifth cylindrical surface 146 of reduced axial extent by a fourth radial surface 144. Stationary seal member 350 engages a rotary seal member 352 of conventional construction with a second annular gasket 358 being pressed between the fourth radial surface 44 of the gland 110 and the end of a housing 326 in conjunction with a shaft 348.

FIG. 7 illustrates the manner in which the second embodiment 110 can also be associated with a fourth stationary seal member 450 employing a sealing ring 454 between it and the gland member. It will be appreciated that a similar sealing member of smaller outside diameter could be mounted in the same manner in conjunction with the second cylindrical surface 134 by a simple reversal of the orientation of the seal gland 110.

FIG. 8 illustrates a universal gland having an alternative peripheral configuration which could be employed with either of the gland members 10 or 110 in which outer cylindrical surface 112 is interrupted by planar chordal surfaces 113 and 115 to reduce the height of the gland member for use in housings where clearance is reduced. Also, the alternative construction of FIG. 8 illustrates the employment of inwardly extending U-slots 117 for receiving mounting bolts for clamping the gland in position in a well-known manner. Moreover, bolt hole openings 124 are also providable on any of the concentric rings 118 in the same manner as discussed with respect to the embodiment of FIG. 1.

Thus, it will be seen that the embodiments of the invention as discussed above are usable with a wide variety of rotary seal systems and different shaft sizes so as to be usable with a wide variety of devices. Numerous modifications of the disclosed embodiments will undoubtedly occur to those of skill in the art, for example, the gland could be formed of metal when the device is to be used in high-temperature environments such as on hot fluid pumps.

Also, the exact array of the cylindrical surfaces can be varied; for example, the positions of surfaces 38 and 40 could be reversed so that surface 38 would occupy the position of surface 40 and vice versa. It therefore should be understood that the spirit and scope of the invention is to be limited solely by the appended claims.

I claim:

1. A universal mechanical seal gland for positioning an annular seal against a shaft housing and a rotary seal member on a shaft, said seal gland comprising a solid body member formed of plastic and having front and rear parallel planar face surfaces, an aperture extending through said body member concentrically oriented with respect to a main axis perpendicular to said front and rear parallel planar face surfaces, said aperture being defined by a plurality of coaxial cylindrical surfaces of different diameters with adjacent ones of said cylindrical surfaces being connected by planar sealing surfaces oriented perpendicularly to the axis of said coaxial cylindrical surfaces wherein said coaxial cylindrical surfaces include a central cylindrical surface of smaller diameter than the other cylindrical surfaces and a second cylindrical surface positioned adjacent said central cylindrical surface, a third cylindrical surface positioned adjacent and between said second cylindrical surface and said front planar face surface, a fourth cylindrical surface positioned adjacent and between said central cylindrical surface and a fifth cylindrical surface positioned adjacent the rear planar face surface.

2. The seal gland of claim 1 additionally including a plurality of concentric circles formed on said front planar face surface and coaxially positioned with respect to said cylindrical surfaces.

3. The seal gland of claim 2 wherein said coaxial cylindrical surfaces include a central cylindrical surface of smaller diameter than the other cylindrical surfaces and a second cylindrical surface positioned adjacent said central cylindrical surface, a third cylindrical surface positioned adjacent and between said second cylindrical surface and said front planar face surface, a fourth cylindrical surface positioned adjacent and between said central cylindrical surface and a fifth cylindrical surface positioned adjacent the rear planar face surface.

4. The seal gland of claim 2 additionally including bolt receiving apertures extending through said solid body member.

5. The seal gland of claim 1 wherein said third cylindrical surface is of greater diameter than said second cylindrical surface, said fourth cylindrical surface is of less diameter than said second cylindrical surface and said fifth cylindrical surface is of greater diameter than said fourth cylindrical surface but is of less diameter than said second cylindrical surface.

6. The seal gland of either of claims 1, 2, or 5 wherein said solid body member has an outer periphery defined by first and second outwardly facing cylindrical surfaces of equal diameter coaxial with said main axis and connected on opposite edged terminations by first and second parallel chordal planar surfaces and further including bolt receiving slots extending radially inwardly of an intermediate portion of said first and second outwardly facing cylindrical surfaces and first and second bolt receiving apertures extending through said solid body member at locations respectively inwardly of said first and second parallel chordal surfaces.

7. A universal mechanical seal gland for positioning an annular seal against a shaft housing and a rotary seal member on a shaft, said seal gland comprising a solid body member formed of plastic and having front and rear parallel planar face surfaces, an aperture extending through said body member concentrically oriented with respect to a main axis perpendicular to said front and rear parallel planar face surfaces, said aperture being defined by a plurality of coaxial cylindrical surfaces of different diameters with adjacent ones of said cylindrical surfaces being connected by planar sealing surfaces oriented perpendicularly to the axis of said coaxial cylindrical surfaces wherein said coaxial cylindrical surfaces include a central cylindrical surface of smaller diameter than the other cylindrical surfaces and second cylindrical surface positioned adjacent said central cylindrical surface, a third cylindrical surface of greater diameter than said second cylindrical surface positioned adjacent and between said second cylindrical surface and said front planar face surface, a fourth cylindrical surface of greater diameter than said second cylindrical surface but of less diameter than said third cylindrical surface positioned adjacent and between said central cylindrical surface and a fifth cylindrical surface of greater diameter than said third cylindrical surface positioned adjacent the rear planar face surface.

* * * * *